United States Patent
Kramer

(10) Patent No.: US 9,964,662 B2
(45) Date of Patent: May 8, 2018

(54) DIRECTIONAL MEASUREMENTS USING NEUTRON SOURCES

(71) Applicant: Roke Technologies Ltd., Calgary (CA)

(72) Inventor: Hermann Kramer, Calgary (CA)

(73) Assignee: Roke Technologies Ltd., Calgary, Alberta (CA)

(*) Notice: Subject to any disclaimer, the term of this patent is extended or adjusted under 35 U.S.C. 154(b) by 0 days. days.

(21) Appl. No.: 14/768,969

(22) PCT Filed: Feb. 18, 2014

(86) PCT No.: PCT/CA2014/000118
§ 371 (c)(1),
(2) Date: Aug. 19, 2015

(87) PCT Pub. No.: WO2014/127453
PCT Pub. Date: Aug. 28, 2014

(65) Prior Publication Data
US 2016/0003968 A1  Jan. 7, 2016

Related U.S. Application Data

(60) Provisional application No. 61/766,825, filed on Feb. 20, 2013, provisional application No. 61/766,823, filed on Feb. 20, 2013, provisional application No. 61/766,826, filed on Feb. 20, 2013.

(51) Int. Cl.
| | |
|---|---|
| *G01V 5/10* | (2006.01) |
| *E21B 47/026* | (2006.01) |
| *G01V 5/04* | (2006.01) |
| *E21B 47/02* | (2006.01) |
| *E21B 7/04* | (2006.01) |

(52) U.S. Cl.
CPC .............. *G01V 5/10* (2013.01); *E21B 7/04* (2013.01); *E21B 47/02* (2013.01); *E21B 47/026* (2013.01); *G01V 5/045* (2013.01); *G01V 5/104* (2013.01)

(58) Field of Classification Search
None
See application file for complete search history.

(56) References Cited

U.S. PATENT DOCUMENTS

| | | | |
|---|---|---|---|
| 5,481,105 A | 1/1996 | Gold | |
| 5,804,820 A | 9/1998 | Evans et al. | |
| 2002/0096363 A1* | 7/2002 | Evans | E21B 49/00 175/41 |
| 2007/0034793 A1 | 2/2007 | Estes et al. | |
| 2011/0238313 A1 | 9/2011 | Thornton et al. | |

FOREIGN PATENT DOCUMENTS

| | | |
|---|---|---|
| CN | 1206837 A | 2/1999 |
| EP | 864 883 A2 | 9/1998 |
| GB | 2 396 908 A | 7/2004 |
| WO | 02/48499 A2 | 6/2002 |
| WO | 2013/009515 A1 | 1/2013 |

* cited by examiner

*Primary Examiner* — Yara B Green
(74) *Attorney, Agent, or Firm* — Dilworth & Barrese, LLP

(57) ABSTRACT

A measurement tool, primarily for use in a bore hole, has a neutron source located within a housing and a neutron-based detector located within the housing. At least one of the neutron source and the neutron-based detector offset from a longitudinal axis of rotation. The axially offset neutron source or neutron-based detector allow directional measurements to be made of the formations surrounding the bore hole by rotating the tool within the bore hole.

18 Claims, 13 Drawing Sheets

(A)

(B)

(C)

DIRECTIONAL MEASUREMENTS USING NEUTRON SOURCES

TECHNICAL FIELD

The current description relates to directional measurements in a borehole and in particular to directional measurements in a borehole based on information generated from neutron sources.

BACKGROUND

Borehole measurement devices may be used to determine formation characteristics surrounding the borehole and are typically used in wellbores drilled for the purpose of extracting natural resources, such as hydrocarbon, from the formations surrounding the borehole. Borehole measurement devices may use different types of measurements, for example, a borehole measurement device may use gamma measurements, thermal neutron measurements, resistivity measurements or other types of measurements.

FIG. 1 depicts the use of a borehole measurement device in determining formation characteristics of an existing vertical borehole. As depicted, a borehole 102 is drilled through a plurality of formations 104a, 104b, 104c, 104d, 104e. A measurement device 106 may be lowered down the borehole to determine one or more characteristics. The measurement device 106 may include, for example, a neutron source 108 and one or more neutron detectors 110a, 110b, such as gamma detectors, thermal neutron detectors, or epithermal neutron detectors. The measurement characteristics may be associated with the height of the measurement within the borehole. Measurements in vertical boreholes may be made after the borehole is drilled or as it is being drilled.

Boreholes may also include a horizontally drilled portion. For horizontal boreholes, the direction of drilling can be controlled to 'steer' the borehole. The direction of the drilling may be controlled using geo-navigation. Geo-navigation may utilize rock cutting analysis and/or resistivity and/or natural gamma ray measurements to determine formation characteristics of the surrounding formations and so determine an appropriate or desirable drilling direction. Rock cutting analysis generally involves a well site geologist performing an analysis on the rock cuttings during drilling. The drilling direction is then based on the results of the analysis. When utilizing down hole measurements, such as resistivity and natural gamma ray, the measurement analysis can be used to make decisions on well path or well architecture.

In geo-navigation, it is desirable to be at the front of the drilling string, or as close to the front of the drilling string as possible, and to measure formation characteristics as far ahead of the drill bit as possible. In order to provide directional information, it is necessary to be able to provide measurements in the radial direction of the drilling string. Typically, the directional measurements have not involved nuclear-based measurements due to the omni-directional nature of the measurements. Gamma detectors can provide radial measurements through the use of shielding material having a window in one location. While a windowed gamma detector can provide radial measurements, it would be desirable to use neutron measurements such as thermal or epithermal measurements as these neutrons are able to penetrate further into formations. However, the thickness of shielding required to shield neutrons is large and as a result may be impractical to use in a down hole application.

It is desirable to make neutron measurements in a radial direction.

SUMMARY

In accordance with an embodiment of the present disclosure there is provided an apparatus for use in directional drilling comprising a housing sized to be received within a borehole and having a longitudinal axis of rotation, a neutron source located within the housing and a neutron-based detector located within the housing, at least one of the neutron source and the neutron-based detector offset from a longitudinal axis of rotation.

In a further embodiment of the apparatus the neutron source is located along the longitudinal axis of rotation and the neutron-based detector is offset from the longitudinal axis of rotation.

In a further embodiment of the apparatus the neutron-based detector is located along the longitudinal axis of rotation and the neutron source is offset from the longitudinal axis of rotation.

In a further embodiment of the apparatus the neutron source is offset from the longitudinal axis of rotation and the neutron-based detector is offset from the longitudinal axis of rotation.

In a further embodiment of the apparatus the neutron-based detector is one of an epi-thermal neutron detector; a thermal neutron detector; and a gamma detector.

In a further embodiment of the apparatus further comprises a second neutron-based detector located within the housing.

In a further embodiment of the apparatus the neutron detector is a thermal neutron detector and the second neutron detector is a gamma detector.

In a further embodiment of the apparatus further comprises a short thermal neutron detector located at a first distance in a longitudinal direction from the neutron source; a long thermal neutron detector located at a second distance, greater than the first distance, in the longitudinal direction from the neutron source; a short gamma detector located at a third distance in the longitudinal direction from the neutron source; and a long gamma detector located at a further distance, greater than the third distance, in the longitudinal direction from the neutron source.

In a further embodiment of the apparatus at least one of the neutron source and the neutron detector are rotatable about the longitudinal axis of rotation relative to the borehole.

In a further embodiment of the apparatus further comprises a bearing measurement device capable of determining a rotational position of the neutron-based detector relative to the neutron source.

In a further embodiment of the apparatus further comprises a communication interface to communicate measurements of the neutron-based detector to a computing device located external to the borehole.

In a further embodiment of the apparatus wherein the communication interface further communicates a rotational position of the neutron-based detector relative to the neutron source.

In a further embodiment of the apparatus the communication interface provides real-time, or near real-time communication with the computing device located external to the borehole.

In accordance with further embodiment of the present disclosure there is further provided a method of determining radial direction information of formation characteristics surrounding a borehole. The method comprises receiving measurement information from down-hole measurement device comprising a neutron source and a neutron-based detector, at least one of the neutron source and the neutron-based detector offset from a longitudinal axis of rotation of the measurement device, the measurement information comprising a measurement by the neutron-based detector and an indication of a relative bearing of the neutron source and neutron-based detector relative to the borehole when the associated measurement was taken; and determining a formation characteristic at a radial direction around the borehole, the formation characteristic determined based on the received indication of the measurement by the neutron-based detector, the radial direction determined from the relative bearing.

In a further embodiment of the method the down-hole measurement device comprises a plurality of neutron detectors aligned asymmetrically with the neutron source.

In a further embodiment of the method the plurality of neutron detectors comprise at least one thermal neutron detector; at least one gamma detector.

In a further embodiment of the method the plurality of neutron detectors comprise a short thermal neutron detector; a long thermal neutron detector; a short gamma detector; and a long gamma detector.

BRIEF DESCRIPTION OF THE DRAWINGS

Embodiments are described herein with references to the appended drawings, in which.

DESCRIPTION

As described further below, it is possible to make directional measurements using a neutron source without the use of shielding. The neutron-based directional measurements can be used in geo-navigation of borehole drilling. That is, the directional measurements can be used in determining, or facilitating the determination of, formation characteristics surrounding the borehole and to determine a drilling path of the borehole. Neutron sources and detectors can provide useful information on formation characteristics. As described further herein, it is possible to determine a direction of these measurements and so determine a location or suggested location of relevant formation characteristics. Accordingly, it is possible to use the directional measurements to 'steer' the drill path of the borehole towards a location having desired formation characteristics, allowing a more optimized drilling architecture for hydrocarbon production such as oil or natural gas.

Figure 1:
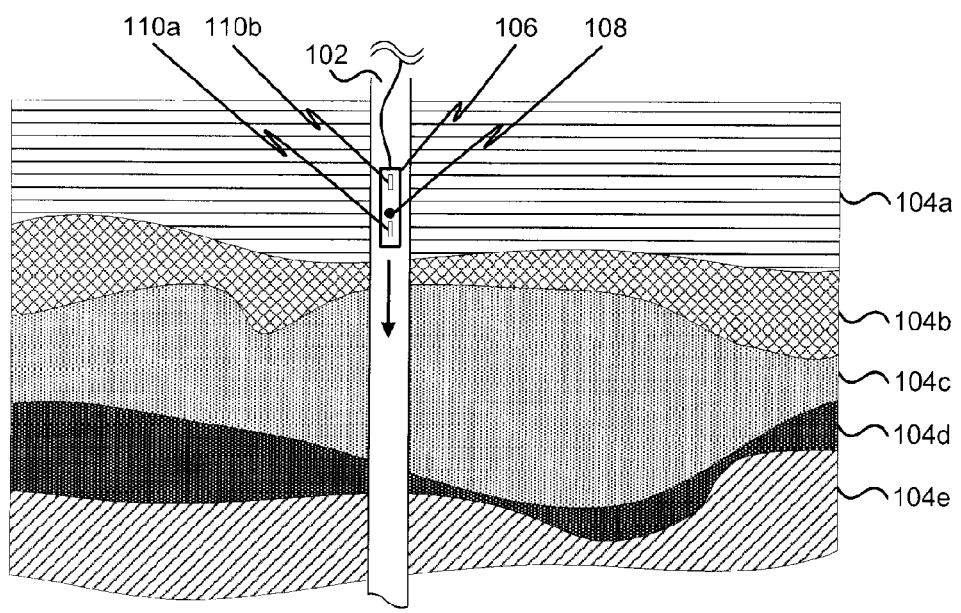
FIG. 1 is a diagram of a logging tool for providing down-hole measurements in a vertical borehole.
Figure 2:
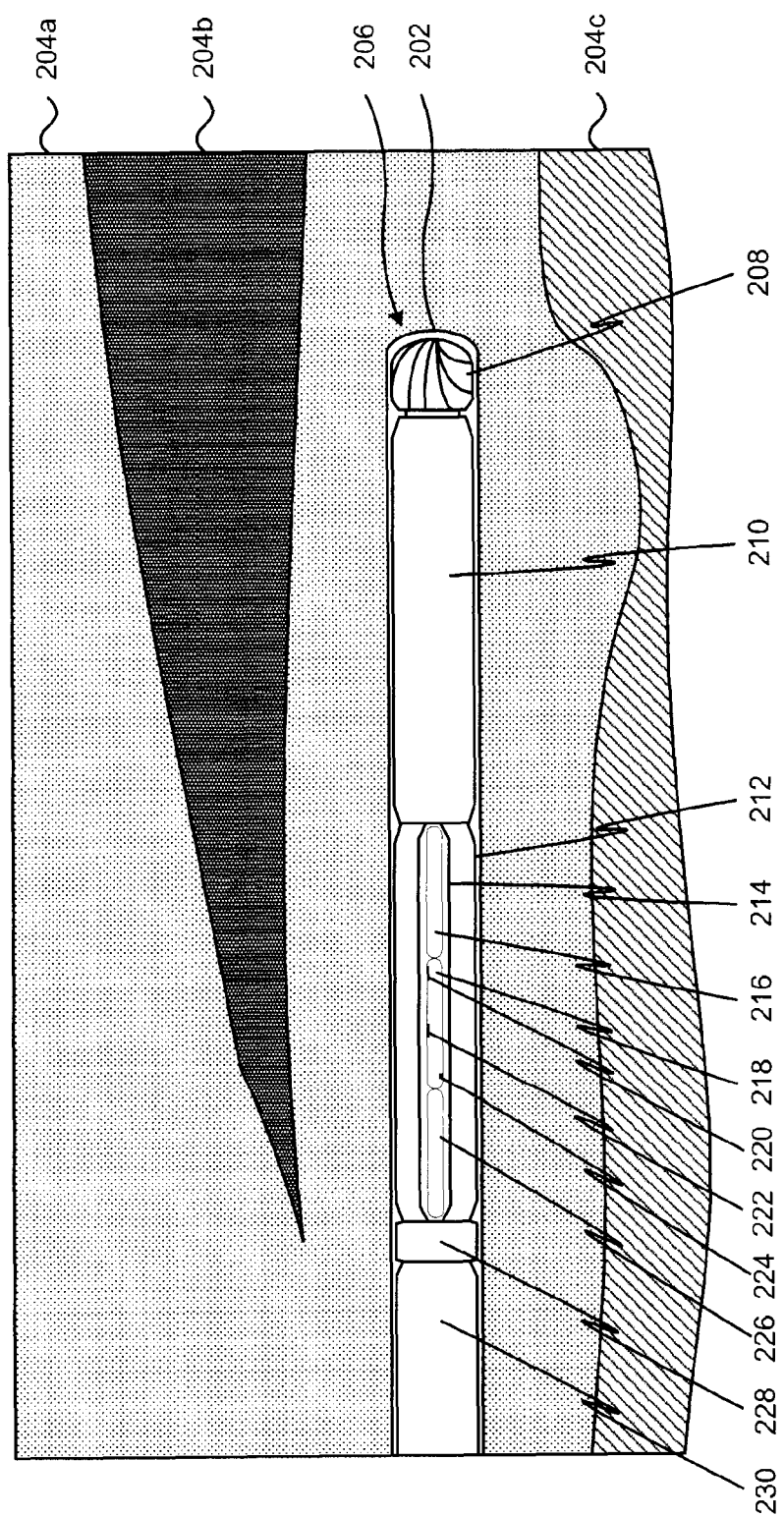
FIG. 2 is a diagram of a drilling system for directional measurements using a neutron source.

FIG. 2 is a diagram of a drilling system for taking directional measurements using a neutron source. As depicted, a borehole 202 is drilled through the ground, which may comprise numerous different formations 204a, 204b, 204c (referred to collectively as formations 204). As will be appreciated, different formations will have different characteristics such as porosity, density, clay levels, oil saturation, water saturation and other characteristics. The desired drill path can be determined based on these desired characteristics. For example, if the borehole is being drilled for an oil well, it would be desirable to steer the borehole into a formation that has high oil saturation, or characteristics that suggest a high oil saturation. The borehole 202 is formed by a drilling system 206.

The drilling system 206 comprises a number of components for drilling the borehole 202 as well as measuring and logging data of the borehole 202 and surrounding formations 204. As will be appreciated, the drilling system 206 is representative of a typical drilling system and numerous specific drilling systems are possible, with their particular suitability to particular applications known to one skilled in the art. The drilling system 206 comprises a drilling string in the borehole. The drilling string has at its head a drill bit 208 and a mud motor 210. Drilling mud is supplied to the mud motor 210 from the surface under pressure. The drilling mud causes the mud motor 210 to rotate the drill bit 208. It is noted that when using a mud motor as depicted, up-string components, that is components of the drilling string connected between the mud motor 210 and the surface do not rotate with the drill bit 208.

One or more pipes 212 may be included in the drill string. The pipe 212 is depicted as having a number of sensor devices 216, 218, 226 within its interior 214. As will be appreciated, numerous different sensor devices can be incorporated into the drill string at various different locations. The sensor devices 216, 218, 226 are depicted as being housed within the same pipe 212 for convenience. The different sensor devices may provide various functionality. For example, sensor device 216 may provide telemetry measurements, inclination measurements, magnetic field strength measurements, pressure measurements, vibration measurements, or other types of measurements as desired or appropriate as would be appreciated.

The sensor device 218 also provides measurements, however as described further below, it provides neutron-based measurements. These measurements can provide an indication of formation characteristics surrounding the borehole. Advantageously, these measurements are directional, so it is possible to determine characteristics of formations in particular radial directions. For example, it is possible to determine characteristics of the borehole 'above' the borehole and 'below' the borehole. It is noted that 'above' and 'below' are relative to the borehole in FIG. 2. The formation characteristics that can be determined from the measurements depend upon the sensors incorporated into the device, however may include measurements such as density, porosity, saturation, borehole caliper. The sensor device 218 is depicted as having a neutron source 222 and two neutron based detectors 220, 224. For example, one of the detectors, 220 may be a gamma detector and the second detector 224 may be a thermal neutron detector or epi-thermal neutron detector. As described further below, the neutron source 222, the detectors 220, 224 or both are arranged off-center with regard to a longitudinal axis of the sensor device 218. The off-center arrangement allows directional measurements to be made as the sensor device 218 is rotated relative to the borehole 202.

The sensor devices 216, 218 may store the measurement information internally in memory for later retrieval and processing at the surface. Additionally or alternatively, the measurement information, or a portion of the measurement information, may be transmitted in real-time or near real-time to the surface using various communication techniques. For example, an additional device 226 may receive the measurement information from a plurality of sensor devices 216, 218 and provide storage of the measurements and/or communicate the measurements to the surface. For example, the additional device 226 can provide a wire line communication interface or other type of down-hole communication interface such as mud-pulse communication. Although the storage and/or communication of measurements by sensor devices 216, 218 have been described as being provided by an additional device 226, it is contemplated that the storage and/or communication interface may be provided in each individual device.

The directional measurements provided by the neutron based device 218 may be used in determining characteristics of formations at various radial directions about the borehole. These directional measurements can be used in determining a drill path for the borehole. The drill string may also comprise a directional component 228 that can control an orientation of the drill bit 208, and so control the drill path. Numerous techniques for steering the drill bit are known and are not discussed further herein. A drill collar comprising sections of large diameter pipe 230 are connected to the other components to form a down-hole assembly. The down-hole assembly is supported from the surface by a number of smaller diameter drill pipes.

Broadly, the neutron-based directional measurement device 218 is rotated within the borehole 202 and takes directional measurements of the formations surrounding the borehole. The measurements are used to determine characteristics of the formations, which in turn can be used to determine the desired drill path. The orientation of the drill bit 208 can then be adjusted in order to drill the borehole 202 along the desired drill path.

Figure 3:
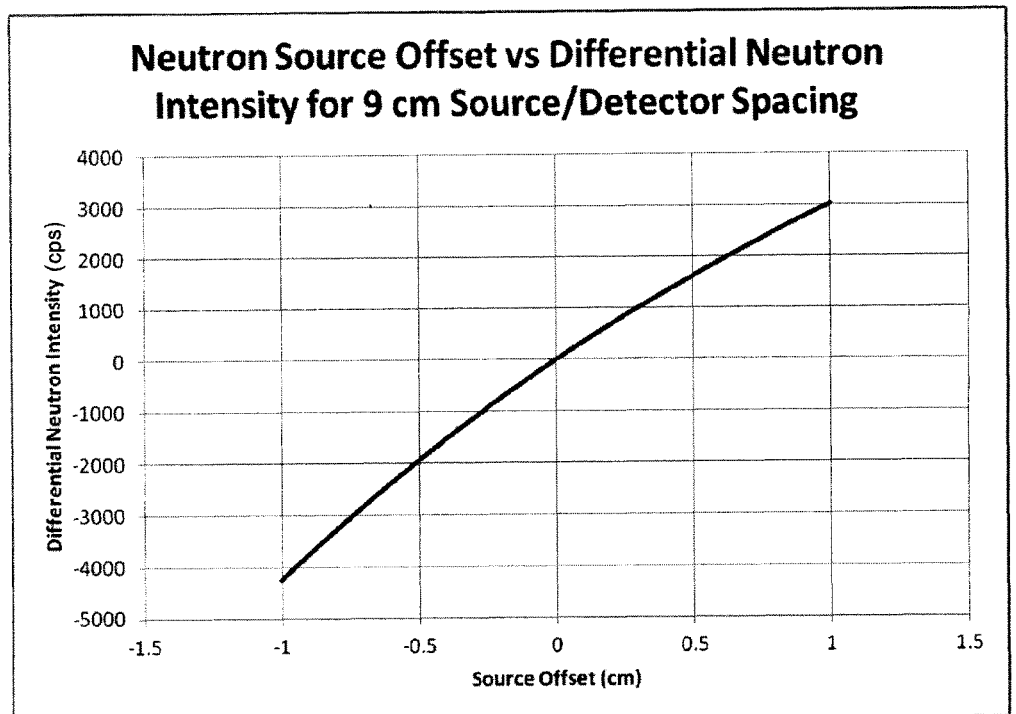
FIG. 3 depicts a chart of neutron source offset vs. differential neutron intensity.

FIG. 3 depicts a chart of neutron source offset vs. differential neutron intensity. A neutron source was initially located 9 cm from the neutron detector and the initial intensity was 16,000 cps. As the neutron source/neutron detector spacing was decreased to 8 cm the detected intensity lowered by approximately 4000 cps. As the neutron source/neutron detector was increased to 10 cm the detected intensity increased by approximately 3000 cps. As can be seen, by varying the distance between the neutron source and neutron detector by as little as 2 cm, the intensity changed by approximately 7000 cps.

Even small changes of the orientation of the neutron source and neutron-based detectors can result in large changes in the measurements. It was determined by the inventors that a small change in the orientation of the neutron source and detector relative to a formation could provide directional measurements using neutron sources without the need for shielding.

Figure 4:
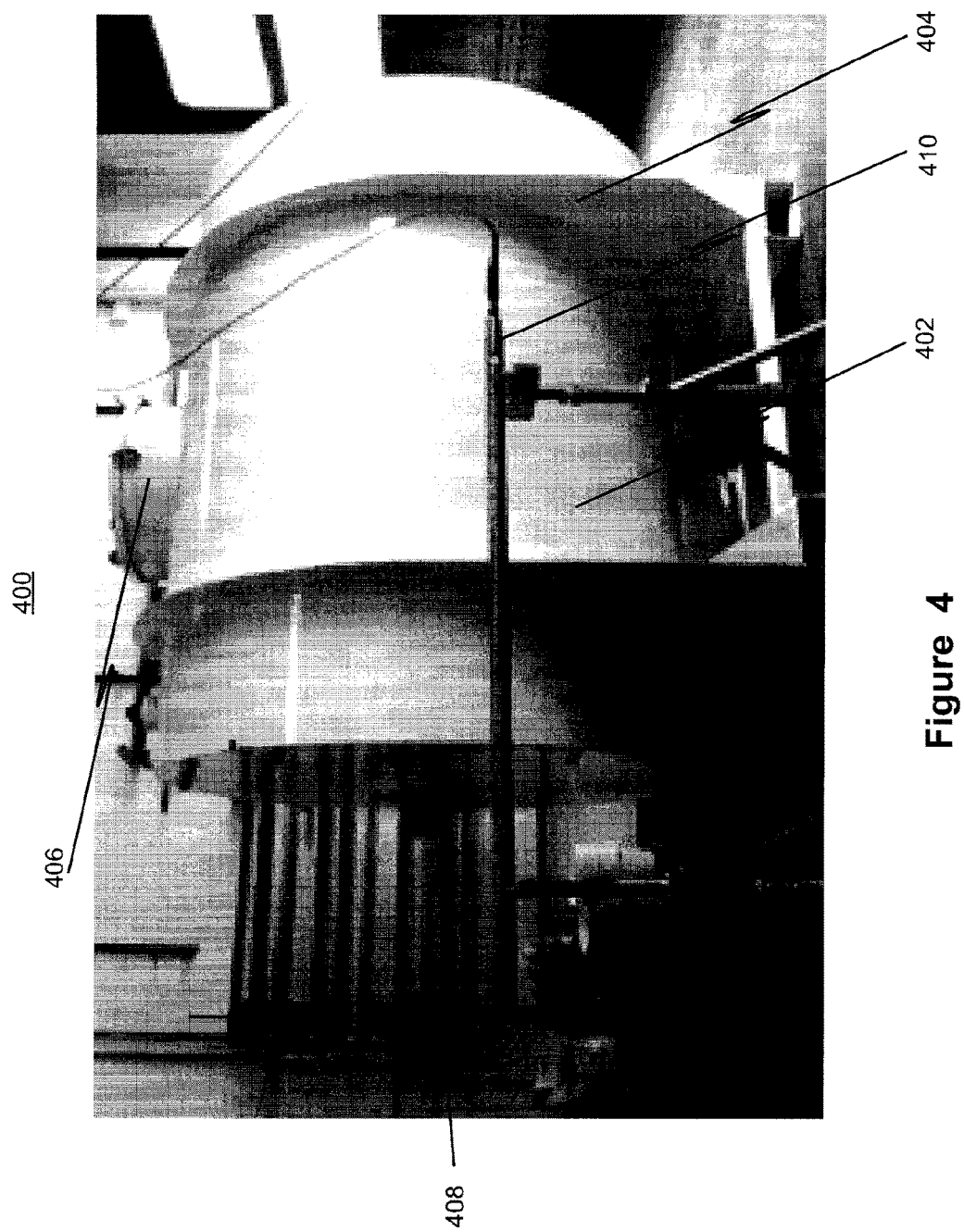
FIG. 4 is a diagram of a testing apparatus used in testing directional measurements using a neutron source.

FIG. 4 is a diagram of a testing apparatus used in testing directional measurements using a neutron source. The testing apparatus 400 comprises a large holding tank 402, which is approximately 6 feet in diameter and 7 feet long, supported by a frame 404. An opening 406 at the top of the tank 402 allows the tank to be filled and emptied. A pipe 408 passes through the longitudinal center of the tank 402. The pipe 408 has an opening that allows a neutron-based measurement device 410 to be inserted into the filled tank 402 in order to take measurements. In testing the neutron-based measurement device 410, the tank 402 can be filled with various liquids, such as freshwater, saltwater and/or oil. In order to determine the ability to make directional measurements, the tank was filled with freshwater and a 32 API oil.

Figure 5:
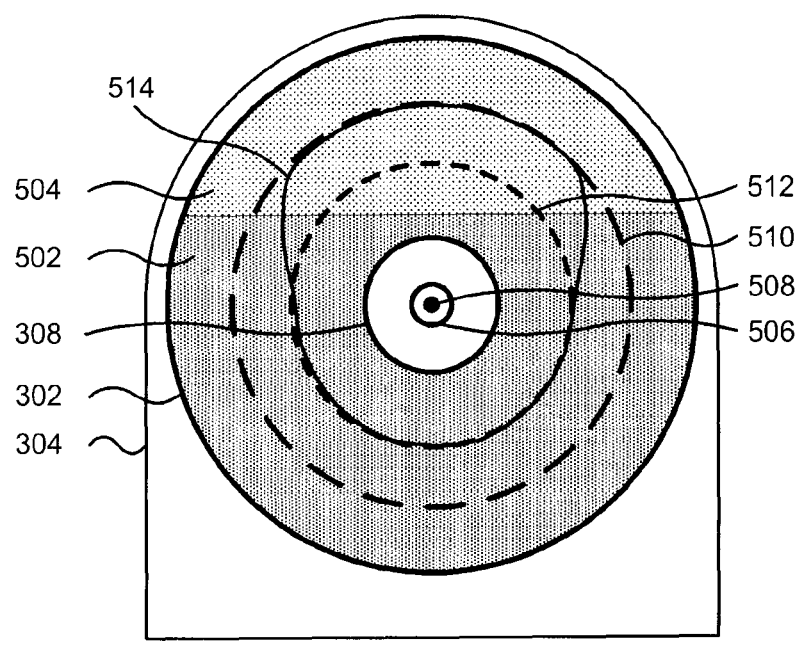
FIG. 5 is a diagram of neutron fields in the testing apparatus of FIG. 3.

FIG. 5 is a diagram of neutron fields in the testing apparatus of FIG. 4. In FIG. 5, the neutron-based measurement device does not provide directional measurements. The tank 302 is filled with freshwater 502 and 32 API oil 504. A neutron-based measurement device is placed within the pipe 308. The measurement device comprises a neutron source 508 and neutron detector 506 that are axially aligned along a longitudinal axis of rotation of the measurement device. The measurement device provides a measurement of the neutron field 514, or the field of influence. The neutron field 514 is a combination of the expected neutron field for the tank filled with fresh water, depicted by dashed circle 512 and the expected neutron field for the tank filled with oil, depicted by dashed circle 510. The oil filled neutron field line 510 represents the theoretical field size if the tank 302 was filled entirely with the 32 API oil. The water filled neutron field line 512 represents the theoretical field size if the tank 302 was filled entirely with water. The combined neutron field line 514 represents the theoretical field shape and size with the mixed oil water fluid. It is noted that the field shapes and sizes depicted are a theoretical depiction and the actual field may look different than depicted. As the measurement device is rotated, the alignment of the neutron source 508 and neutron detector 506 remains unchanged, and as such, regardless of the orientation of the measurement device, the same measurement will result and as such no directional measurements can be made.

Figure 6:
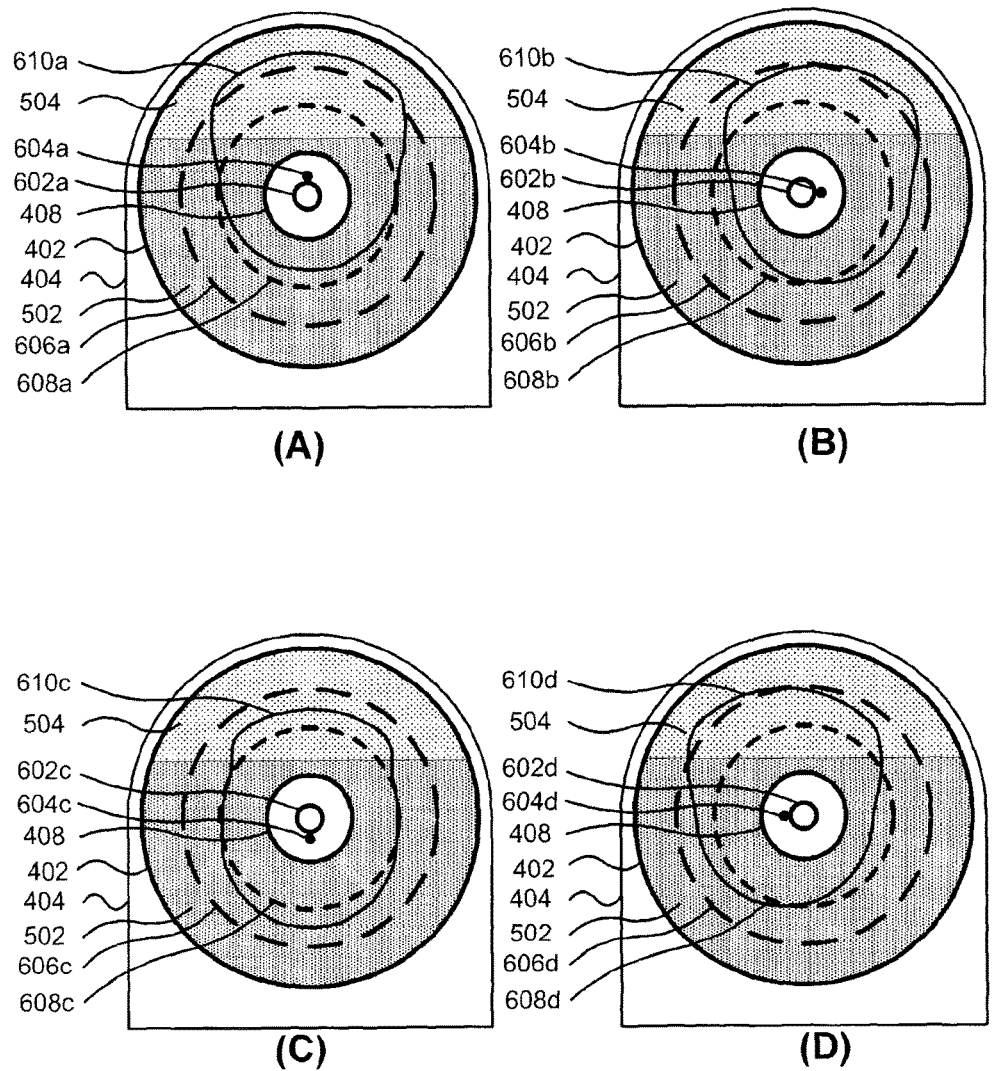
FIGS. 6A-D are diagrams of neutron fields with varying positions of a neutron source in the testing apparatus of FIG. 3.

FIGS. 6A-D are diagrams of neutron fields with varying positions of a neutron source in the testing apparatus of FIG. 4. The arrangement of the testing apparatus of FIGS. 6A-D is substantially similar to that described above and as such, similarly labeled features will not be described again. Unlike the neutron source 508 and neutron detector 506, whose position remained unchanged regardless of the orientation of the measurement device, the positions of the neutron detector 602a, 602b, 602c, 602d and neutron source 604a, 604b, 604c, 604d vary depending upon the orientation of the measurement device. FIG. 6A depicts the position of the neutron source 604a and detector 602a with an assumed rotation of 0 degrees. FIG. 6B depicts the position of the neutron source 604b and detector 602b rotated 90 degrees clockwise relative to FIG. 6A. FIG. 6C depicts the position of the neutron source 604c and detector 602c rotated 180 degrees clockwise relative to FIG. 6A. FIG. 6D depicts the position of the neutron source 604d and detector 602d rotated 27 degrees clockwise relative to FIG. 6A. As depicted, as the orientation of the neutron source and detectors are rotated, the resultant neutron field, and its measurement, varies. If the measurements are associated with the rotational position of the measurement device, it is possible to determine directional measurements for formation characteristics.

Figure 7:
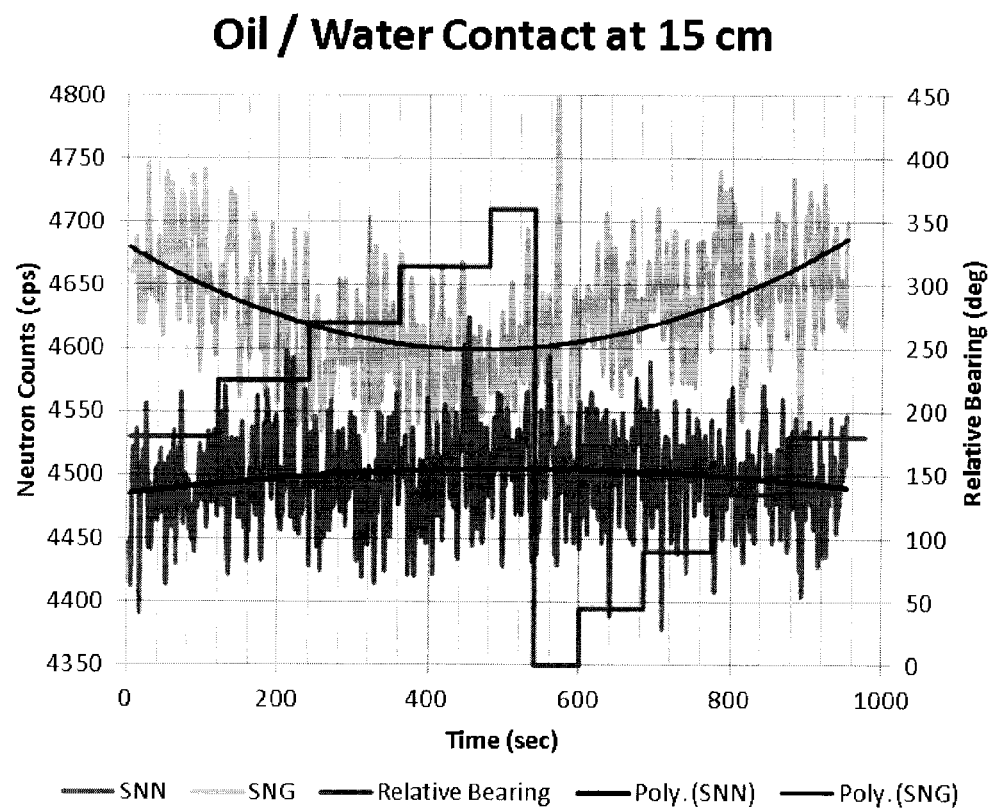
FIG. 7 is a graph of measurements taken in the testing apparatus of FIG. 3.

FIG. 7 is a graph of measurements taken in the testing apparatus of FIG. 4. The measurements were recorded with a neutron measurement device having a neutron source and four spaced neutron detectors. The detectors included a short neutron-neutron detector (SNN), a short neutron-gamma detector (SNG), a long neutron-neutron detector (LNN), a Long neutron-gamma detector (LNG), although only the SNN and SNG values are depicted. It is noted that naming convention for down hole geophysical devices are based on source—detection physics. For example neutron thermal neutron indicates a neutron source and thermal neutron detection. The short detectors were located closer to the neutron source than the long detectors. Further, each of the detectors were aligned along a longitudinal axis of rotation of the measurement device, and the neutron source was aligned off-center from the longitudinal axis of rotation of the measurement device. The tank was filled with water and oil such that the oil-water interface was 15 cm from the center of the tank. The zero degree relative bearing was with the source directly on top of the tool as depicted in FIG. 6A and the measurement device was rotated in a clockwise manner as depicted in FIGS. 6A-D. The Poly curves for both detectors are the best fit second order equation result which will show the largest inflection points for both SNN and SNG. The measurement device was rotated in 40 degree increments and measurements recorded for approximately 120 seconds before rotating the measurement device to the next position.

As can be seen from FIG. 7, the maximum inflection points occur at the 0 degree relative bearing position, corresponding to FIG. 6A. This is in agreement with the theoretical model and confirms that a directional neutron measurement can be made. Since the measurements vary with the rotation of the measurement device, it is possible to use the measurement information, with the associated bearing information, to determine formation characteristics in radial directions of the borehole. This information may then be used in determining a desired drill path.

As a contrived example, if SNN measurement was considered as indicative of the amount of oil in a formation, such that higher SNN measurements indicated larger amounts of oil, the measurements of FIG. 7 could be used to steer the drill path 'upwards', that is in the 0 degree bearing direction. Although the SNN measurement does not directly provide an indication of oil content, the same concept described applies for controlling the drill path based on the measurements associated with a rotational position of the measurement device. That is, a desired formation characteristic can be determined from the different measurements, for example SNN, SNG, LNN and LNG, for different bearings, and then the drill path controlled based on the location of the more desirable formation characteristics.

Figure 8:
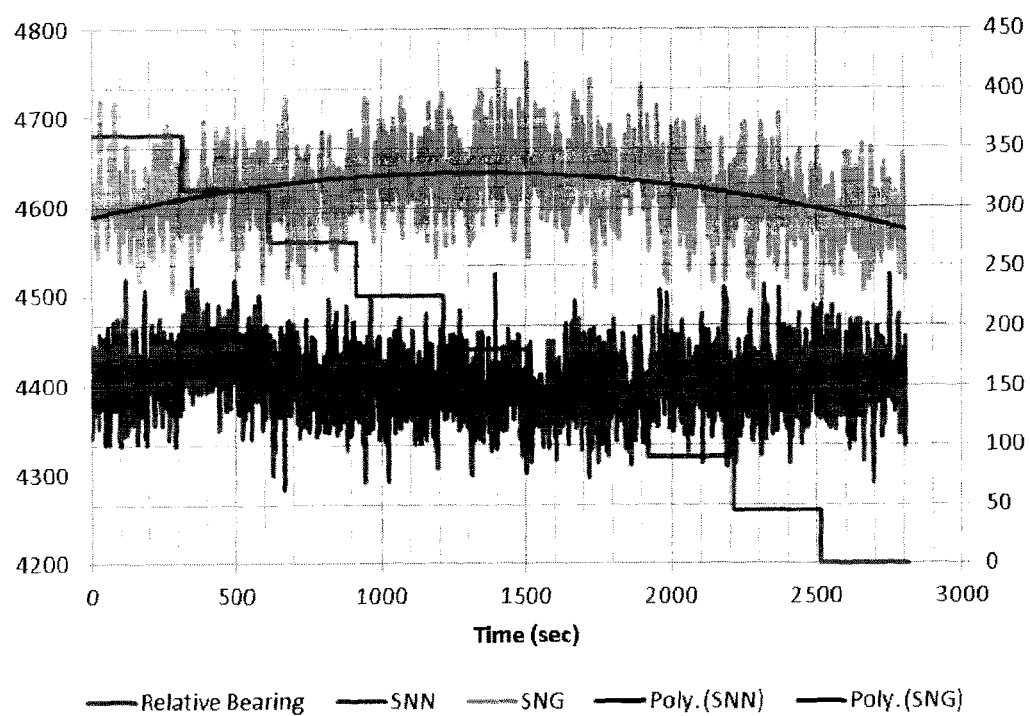
FIG. 8 is a graph of measurements taken in the testing apparatus of FIG. 3.

FIG. 8 is a graph of measurements taken in the testing apparatus of FIG. 4. The arrangement of the measurement device was the same as described above with regard to FIG. 7. For the test of FIG. 8, the tank was filled so that the oil-water interface was located 20.5 cm from the center of the tank. Again the results show that the measurements vary with the rotation of the source and detectors. In particular, the SNN measurements are highest when the source is facing, i.e. at 0 degrees, the oil-water interface and lowest when it is 180 degrees from the interface. Similarly the SNG measurements are lowest when the source is facing, i.e. at 0 degrees, the oil-water interface and lowest when it is 180 degrees from the interface.

From the above, it is clear the neutron-based directional measurements are possible without the use of shielding material. As a further benefit, since no shielding material is used, the count rate will be higher, compared to a sensor wherein shielding material is present. This may be beneficial in gamma and neutron measurements, in which the error decreases with the increased gamma or neutron counts. In particular, the error is proportional to the square root of the number of gamma or neutron counts.

Figure 9:
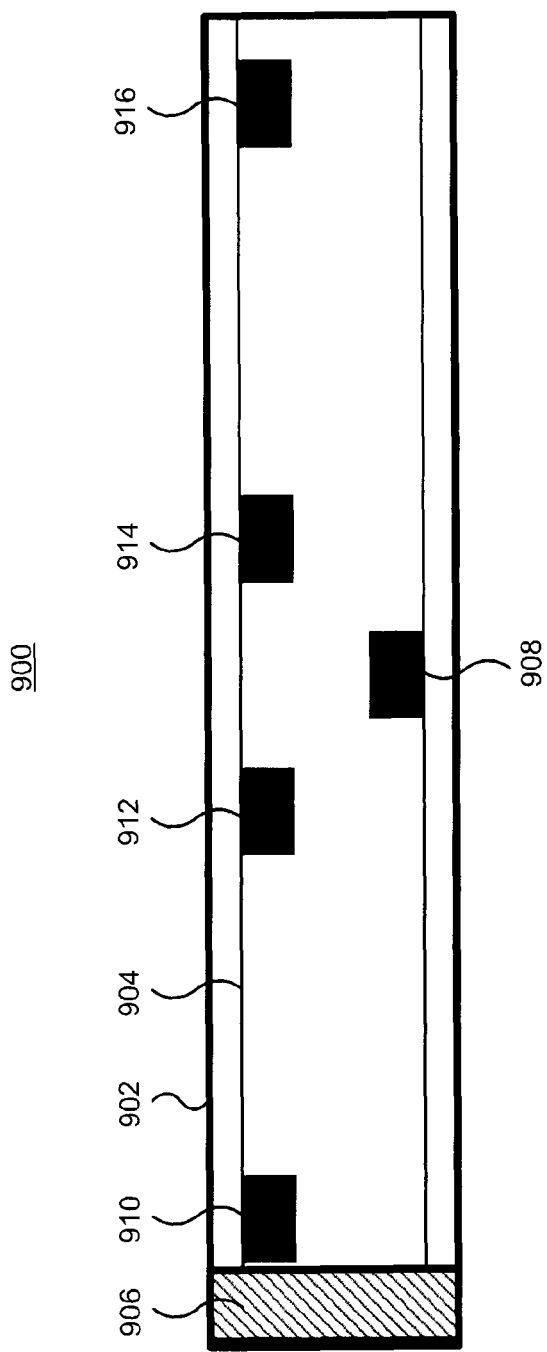
FIG. 9 is a diagram of an example of a logging tool capable of directional measurements using a neutron source.

FIG. 9 is a diagram of an apparatus capable of directional measurements using a neutron source. The apparatus 900 may be incorporated into a drill string in order to provide measurements while drilling. Alternatively, the apparatus 900 may be used to make measurements in an already formed borehole. The apparatus comprises a housing 902 or casing. The housing 902 of the apparatus 900 is elongated and has a longitudinal axis of rotation. An internal housing 904 may be located within the housing 902. The internal housing 904 is rotatable within the housing 902. Alternatively, the housing 902 may be provided by a section of the drill collar or drilling pipe, and the internal housing 904 may be rotatable within the drill collar or drilling pipe. A rotational motor 906 provides rotational movement of the inner housing 904 relative to the housing 902, or more particularly the borehole. The apparatus 900 may include sensors, not shown, for determining a position of the housing 902 within the borehole, as well as sensors for determining a rotational position of the inner housing 904 relative to the housing 902. Since the position of the housing 902 within the borehole is known, and the rotational position of the inner housing 904 relative to the housing is known as well, the position of the inner housing 904 relative to the borehole may be determined.

The apparatus further includes a neutron source 908 and one or more neutron-based detectors 910, 912, 914, 916, such as gamma detectors, thermal neutron detectors and/or epi-thermal neutron detectors. As depicted, the neutron source 908 and neutron-based detectors 910, 912, 914, 916 are arranged off-centre from the apparatus's longitudinal axis of rotation. Although both the neutron source 908 and neutron-based detectors 910, 912, 914, 916 are depicted as being located off-centre, it is contemplated that either the detectors 910, 912, 914, 916 or the neutron source may be aligned with the longitudinal axis of rotation. In order to provide neutron-based directional measurements, the neutron source 908 and the neutron detectors 910, 912, 914, 916 are asymmetrically arranged along the longitudinal axis of rotation such that the orientation of the source 908 and/or detectors 910, 912, 914, 916 relative to the borehole varies with rotation of the apparatus relative to the borehole.

Figure 10:
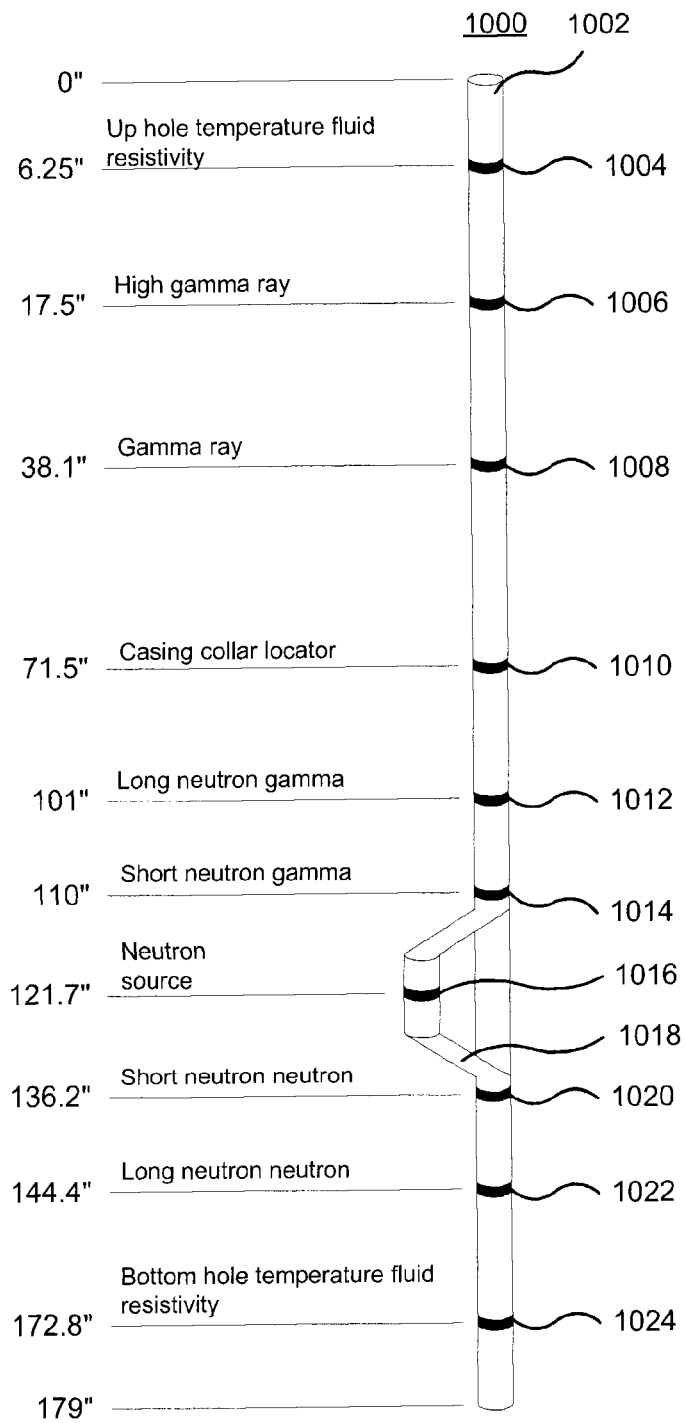
FIG. 10 depicts a further example of a logging tool capable of directional measurements using a neutron source.

FIG. 10 depicts a further logging tool capable of directional measurements using a neutron source. The logging tool 1000 may be received within a drill pipe or a casing. The logging tool 1000 may be rotated with the drill pipe, which in turn is rotated by the drilling rig. Alternatively, an electric motor may be used to rotate the logging tool if power can be supplied to the logging tool from the surface. It will be appreciated that other techniques for rotating the logging tool may be employed.

The logging tool 1000 may comprise a cylindrical housing 1002 for housing the various detectors and components of the tool. Although the particular dimensions may vary, the logging tool 1000 is depicted as having a length of 179 inches. The main cylindrical housing may have an outer diameter of approximately 1.7 inches. As depicted, the logging tool 1000 includes various sensors and detectors located along the length of the tool. An up-hole temperature sensor 1004, which may also measure fluid resistivity, may be located 6.25 inches from an up-hole end of the tool. A high gamma ray detector 1006 and a gamma ray detector 1008 may be located 17.5 inches and 38.1 inches from the up-hole end, respectively. A casing collar locater 1010 may be located at 71.5 inches from the up-hole end. Long and short neutron gamma detectors 1012, 1014 may be located 101 inches and no inches from the up hole end, respectively. A neutron source 1016, such as an Americium Beryllium source, may be located at 121.7 inches from the up-hole end. As described above, the source and detectors are located off axis from each other in order to provide directional measurements. As depicted, the source 1016 may be held out from the main cylindrical body 1002 by arms 1018. The source may be part of a spring loaded arm mechanism that will position the source against an inside surface of the drill pipe in order to provide the offset between the source and detectors. Short and long neutron neutron detectors 1020, 1022 may be located at 136.2 inches and 144.4 inches from the up-hole end, respectively. A bottom hole temperature and fluid resistivity sensor 1024 may be located 172.8 inches from the up hole end of the logging tool. It should be appreciated that the logging tool depicted in FIG. 10 is intended to provide one illustrative arrangement of components. It is contemplated that various components can be omitted, their positions within the tool changed including the lengths from the up-hole end and other components included. The logging tool can provide directional measurements when the neutron source and detectors are arranged off axis from one another.

Figure 11:
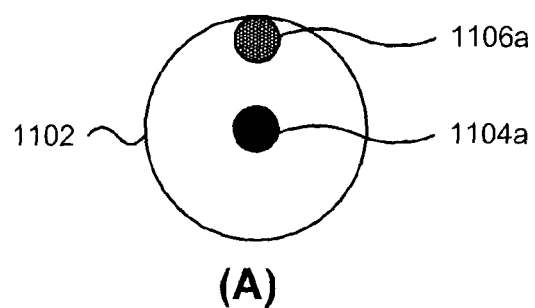
FIGS. 11A-C depict illustrative neutron source and detector alignments.
Figure 11:
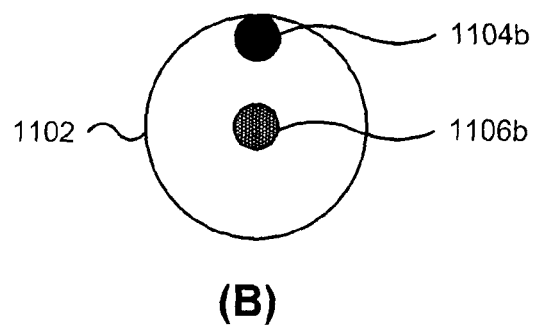
Figure 11:
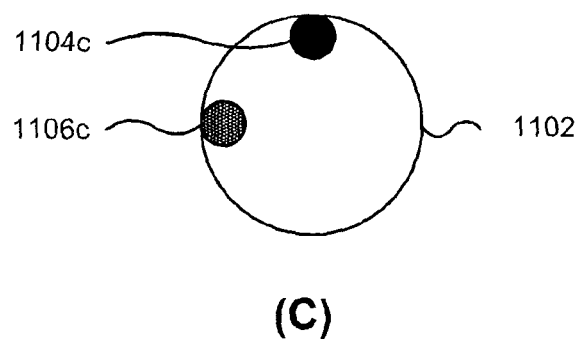

FIGS. 11A-C depict illustrative neutron source and detector alignments. FIGS. 11A-10C depict various asymmetric arrangements of neutron sources and neutron-based detectors relative to the longitudinal axis of rotation of the apparatus. As depicted in FIG. 11A, a neutron source 1104a may be aligned with the longitudinal center of the apparatus, or more particularly the housing 1102 of the apparatus. One or more of the neutron detectors 1106a may be arranged off-centre from the longitudinal axis of rotation of the apparatus. Alternatively, as depicted in FIG. 11b, a neutron source 1104b may be arranged off-centre from the longitudinal axis of rotation of the apparatus, or more particularly the housing 1102 of the apparatus, and one or more of the neutron detectors 1106b may be aligned with the longitudinal axis of rotation of the apparatus. Alternatively, as depicted in FIG. 11c, a neutron source 1104c may be arranged off-centre from the longitudinal axis of rotation of the apparatus, or more particularly the housing 1102 of the apparatus, and one or more of the neutron detectors 1106c may be arranged off-centre from the longitudinal axis of rotation of the apparatus.

Figure 12:
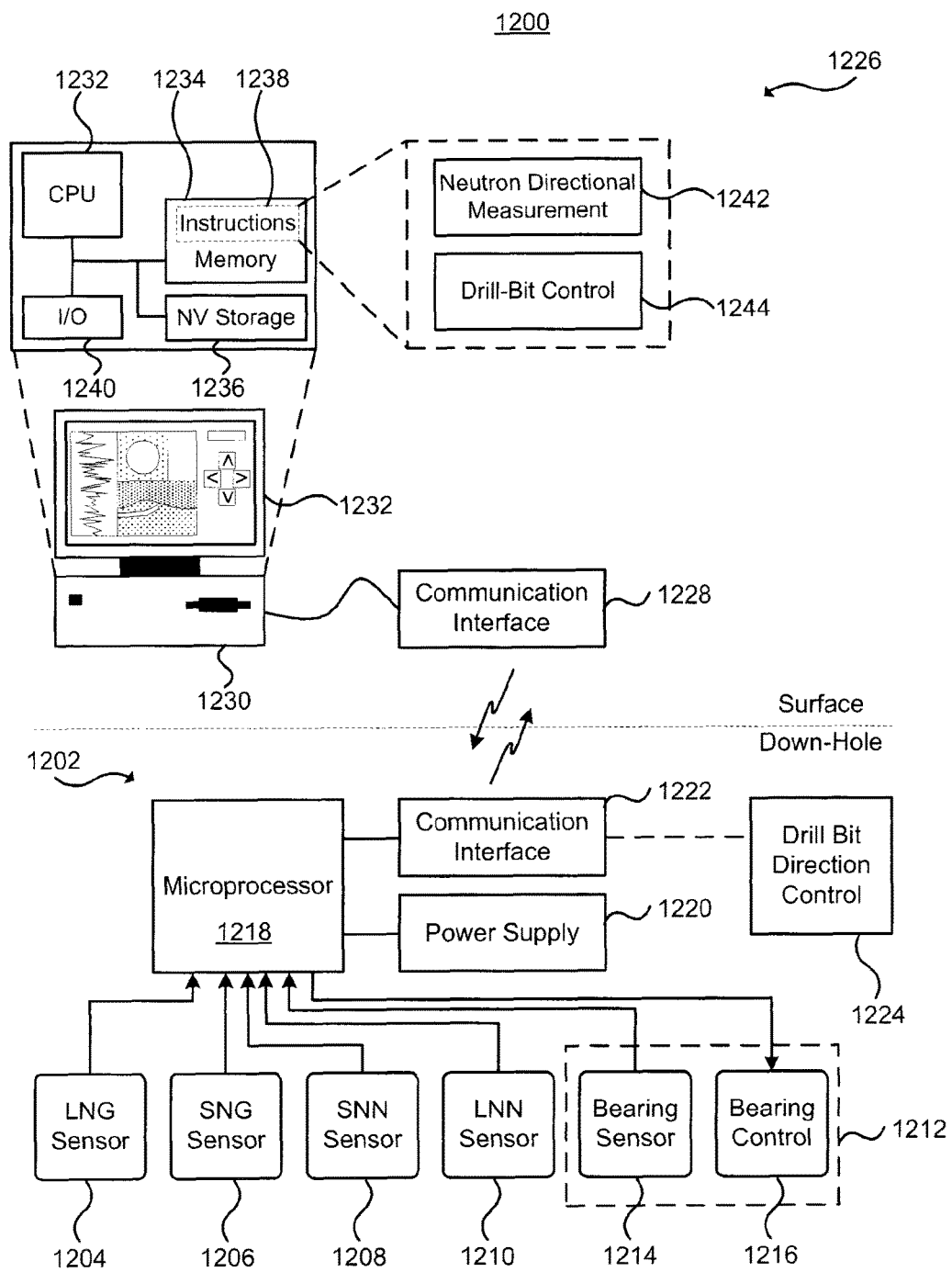
FIG. 12 depicts components of a directional drilling system.

FIG. 12 depicts components of a directional drilling system. The directional drilling system 1200 comprises components located above-surface as well as down-hole components. The down-hole components may be provided as part of a down-hole assembly 1202. The down-hole assembly 1202 comprises a neutron source 1203 that emits neutrons. Various neutron sources are possible such as chemical source including Americium Beryllium (Am—Be) or Plutonium Beryllium (Pu—Be). The size and shape of the neutron source may vary depending on the specific application requirements; however, as an example, a source may be approximately ¾" in diameter and approximately 3" in length. Common source strengths are 3, 5, 15 and 20 curie. The down-hole assembly 1202 includes a plurality of neutron-based detectors 1204, 1206, 1208, 1210. The neutron-based detectors may include a long neutron-gamma (LNG) detector 1204, a short neutron-gamma (SNG) detector 1206, a short neutron-neutron (SNN) detector 1208 and a long neutron-neutron (LNN) detector 1208. The designation of the detectors as 'short' or 'long' is in relation to the distance of the detector from the source in the longitudinal direction of the down-hole assembly 1202. The long detectors, LNG and LNN, are located further away from the source than the short detectors, SNG and SNN. The specific locations of the SNG, SNN, LNG and LNN detectors relative to the neutron source may be changed. The radial alignment of the neutron source 1203 and the neutron-based detectors 1204, 1206, 1208, 1210 is asymmetric with a longitudinal axis of rotation of the down-hole assembly 1202. The measurements made by the different neutron-based detectors may be used individually or in combination in order to provide an indication of formation characteristics, as well as borehole characteristics, at associated rotational positions of the down-hole assembly 1202. The characteristics may include, for example, density, porosity, saturation, borehole caliper. Although described as having specific neutron-based detectors 1204, 1206, 1208, 1210, it is contemplated that the neutron-based direction measurements using different detectors may be made using a similar asymmetrical arrangement of source and detector. For example, a down-hole assembly capable of making direction measurements may include only one type of detector, such as an epi-thermal neutron detector, a thermal neutron detector or a gamma ray detector. Alternatively, a plurality of different detectors, such as epi-thermal neutron and thermal neutron, or epi-thermal neutron and gamma ray, or epi-thermal neutron thermal neutron and gamma ray may be used. Further, the down-hole assembly 1202 described includes both short and long detectors of the different types; however, it is contemplated that the longitudinal arrangement of each of the detectors may vary.

In addition to the neutron source 1203 and neutron-based detectors 1204, 1206, 1208, 1210 the down-hole apparatus 1202 further comprises bearing orientation components 1212 for controlling the orientation of the neutron source 1203 and detectors 1204, 1206, 1208, 1210. The orientation components 1212 may comprise a bearing sensor 1214 that provides an indication of the rotational position of the neutron source and detectors. A bearing control 1216 allows the position of the neutron source and detectors to be rotated relative to the borehole.

The down-hole assembly 1202 may further comprise a microprocessor 1218 and power supply 1220. The microprocessor 1218 receives signals from the detectors 1204, 1206, 1208, 1210 and the bearing sensor 1214. The microprocessor 1218 can process the signals from the various sensors. The processing may include associating the rotational measurement with the measurements from the various detectors. The microprocessor 1218 may also control operation of the bearing control 1216 in order to periodically rotate the source and detectors within the borehole. The measurements and associated rotational position the source and detectors were in when the measurements were taken can be communicated from the down-hole assembly 1202 to the surface using a communication interface 1222. The communication interface 1222 can provide two way communication between the surface and the down-hole assembly 1202. The two way communication can be used to communicate with drill bit direction control 1224 for controlling the orientation of the drill bit, and so the drill path. The communication interface 1222 may communicate with a corresponding communication interface 1228 at the surface. The communication interfaces 1222, 1228 may use one or more communication types, including, for example mud pulse communication.

A control system 1226 provides for drilling control of the borehole from the surface. The control system 1226 may provide information on the formation characteristics based on the directional measurements received from the down-hole assembly over the communication interface 1228. The control system 1226 comprises a computing device, depicted as a computer 1230; however, it is contemplated that the computing device may be provided by one or more computing systems connected together. The control system 1226 includes a means for displaying formation characteristic information. The display means is depicted as a display or monitor 1232; however other display means are possible such as printers, gauges, light emitting diodes (LEDs).

The computing device 1230 comprises a central processing unit 1232 which may be one or more connected processors. A memory unit 1234 and non-volatile storage unit 1236 provide storage of information. The memory unit 1234 may store instructions 1238 that may be executed by processors. Input and output (I/O) interfaces 1240 provides an interface for communications between the computing device 1230 and external devices such as the communication interface 1228. The instructions 1238 include instructions for providing neutron-based directional measurement functionality 1242 and drill bit control functionality 1244.

The drill-bit control functionality 1244 provides functionality for controlling the orientation of the drill bit in order to control the drill path as desired. The neutron based directional measurement functionality 1242 determines formation characteristics surrounding the borehole. The determined formation characteristics may then be used in determining the desired drill path direction.

The formation characteristics that may be determined will vary depending upon what neutron-based detectors are present in the measuring device. If the measurement device includes SNN, SNG, LNN and LNG detectors, the measurements can be combined in numerous ways to provide various characteristics. Determination of characteristics using measurements from SNN, SNG, LNN and LNG detectors is described in co-pending patent applications (Gowlings Ref: U.S. Ser. Nos. 08/922,995 and 08/922,994), the entire contents of which are incorporated by reference herein.

Figure 13:
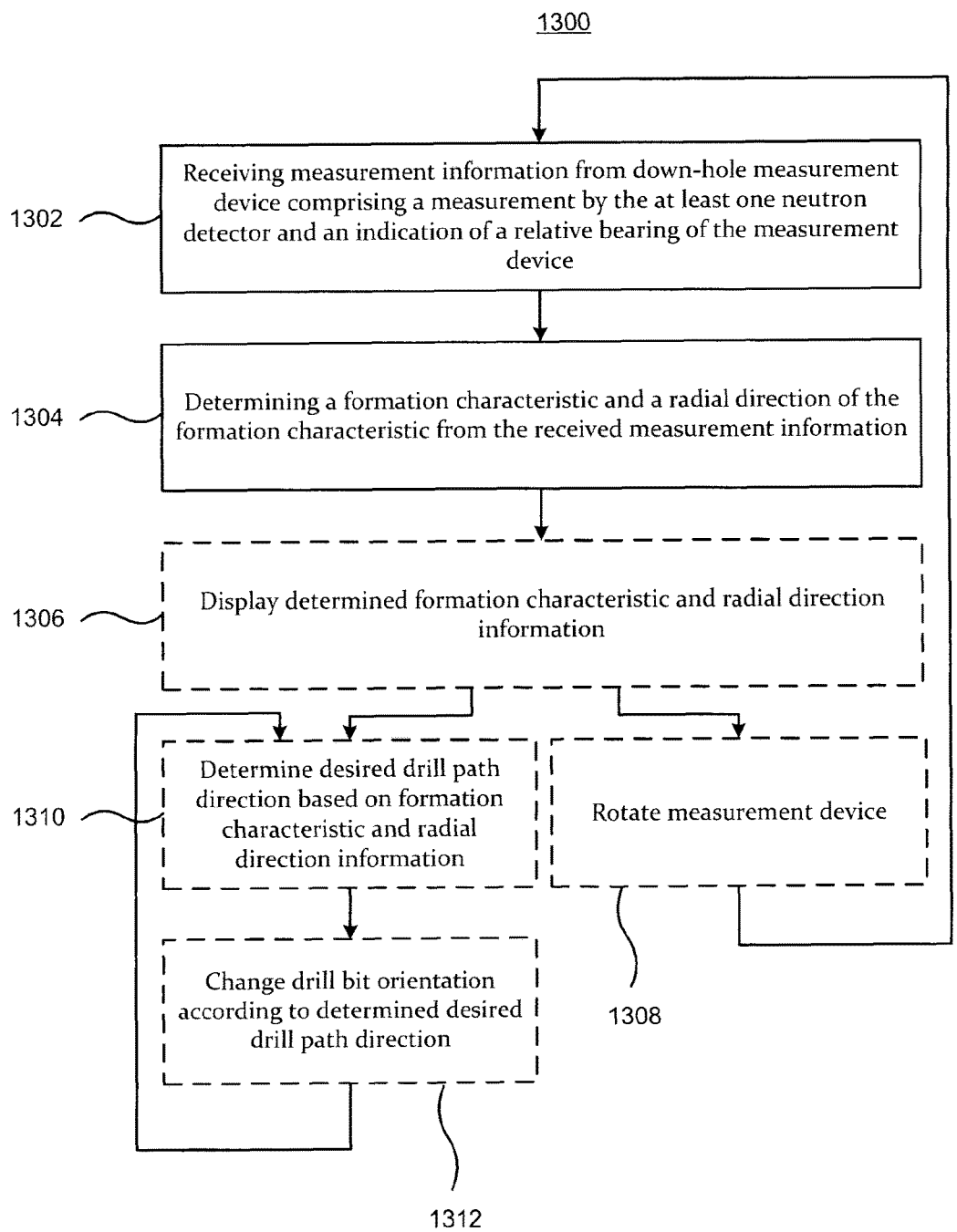
FIG. 13 depicts a method of directional navigation using a neutron source.

FIG. 13 depicts a method of directional navigation using a neutron source. The method may be provided by a combination of the drill-bit control functionality 1244 and the neutron-based directional measurement functionality 1242. The method 1300 begins with receiving measurement information from a down-hole measurement device (1302). The received measurement information comprises a measurement by a neutron-based detector and an indication of a relative bearing of the neutron-based detector of the measurement device. Once the measurement information is received, a formation characteristic at a radial direction about the borehole is determined (1304). The radial direction of the determined formation characteristic is based on the bearing of the neutron-based detector associated with the measurements.

The method 1300 may display the determined formation characteristic and radial direction information (1306). The formation characteristic information may be displayed as it is determined, or formation characteristics may be determined at multiple bearings and displayed together. The method may rotate the measurement device (1308) within the borehole in order to take measurements at a different relative bearing. The new measurements and associated new relative bearing can be received (1302) and used to determine formation characteristics associated with the bearing.

The displayed radial information of formation characteristics can be used in determining the desired drill path direction (1310). Determining the drill path direction may be done automatically in order to steer the drill path towards formation characteristics considered the most favourable or manually by allowing an operator to specify the desired drill path. Once the desired drill path is determined, the drill bit orientation can be changed (1312) so that the borehole will follow the determined drill path.

The above has described a tool capable of making directional measurements in a borehole based on information generated from a neutron source. The directional measurements may be used to geo steer the drilling of a well. The directional measurements may also be useful in existing well bores to detect fluid and formation anomalies or formation characteristics. Further the directional measurements may provide the ability to determine fracture propagation. Although described with particular regard to directional measurements made within a bore hole, it is contemplated that the same techniques may be used to make measurements outside of a borehole. The measurements may provide the ability to detect physical items and features underground from a surface, or in mines. The measurement tool has been described by way of examples. It will be appreciated that components of one example may be incorporated into another example. Furthermore, variations and modifications not described herein will be apparent to one of ordinary skill in the art having regard to the teachings of the description herein.

What is claimed is:

1. An apparatus configured to make directional measurements of a formation for use in directional drilling, the apparatus comprising:
 a housing sized to be received within a borehole and having a longitudinal axis of rotation;
 an unshielded neutron source located within the housing; and
 an unshielded neutron-based detector located within the housing and asymmetrically arranged about the longitudinal axis of rotation of the housing relative to the neutron source,
 wherein said apparatus is configured to rotate such that upon rotation when received within the borehole, directional measurements of the formation radially 360° around the borehole are obtained as said apparatus is rotated 360° about the longitudinal axis of rotation within the borehole.

2. The apparatus of claim 1, wherein the neutron source is located along the longitudinal axis of rotation and the neutron-based detector is offset from the longitudinal axis of rotation.

3. The apparatus of claim 1, wherein the neutron-based detector is located along the longitudinal axis of rotation and the neutron source is offset from the longitudinal axis of rotation.

4. The apparatus of claim 1, wherein the neutron source is offset from the longitudinal axis of rotation and the neutron-based detector is offset from the longitudinal axis of rotation.

5. The apparatus of claim 1, wherein the neutron-based detector is one of:
 an epi-thermal neutron detector;
 a thermal neutron detector; and
 a gamma detector.

6. The apparatus of claim 1, further comprising a second neutron-based detector located within the housing.

7. The apparatus of claim 6, wherein the neutron detector is a thermal neutron detector and the second neutron detector is a gamma detector.

8. The apparatus of claim 1, wherein the neutron-based detector comprises:
- a short thermal neutron detector located at a first distance in a longitudinal direction from the neutron source;
- a long thermal neutron detector located at a second distance, greater than the first distance, in the longitudinal direction from the neutron source;
- a short gamma detector located at a third distance in the longitudinal direction from the neutron source; and
- a long gamma detector located at a further distance, greater than the third distance, in the longitudinal direction from the neutron source.

9. The apparatus of claim 1, wherein at least one of the neutron source and the neutron detector are rotatable about the longitudinal axis of rotation relative to the borehole.

10. The apparatus of claim 9, further comprising a bearing measurement device capable of determining a rotational position of the neutron-based detector relative to the neutron source.

11. The apparatus of claim 1, further comprising a communication interface to communicate measurements of the neutron-based detector to a computing device located external to the borehole.

12. The apparatus of claim 11, wherein the communication interface further communicates a rotational position of the neutron-based detector relative to the neutron source.

13. The apparatus of claim 11, wherein the communication interface provides real-time, or near real-time communication with the computing device located external to the borehole.

14. A method of determining radial direction information of formation characteristics surrounding a borehole, the method comprising:
- rotating a down-hole measurement device within the borehole about a longitudinal axis of rotation of the measurement device, the measurement device comprising an unshielded neutron source and an unshielded neutron-based detector, wherein at least one of the neutron source and the neutron-based detector is offset from the longitudinal axis of rotation of the measurement device,
- receiving directional measurement information from the measurement device and which comprises measurements by the neutron-based detector taken as the measurement device is rotated within the borehole and indications of a relative bearing of the neutron source and neutron-based detector relative to the borehole when the associated measurements were taken, permitting directional measurements of the formation radially 360° around the borehole as the measurement device is rotated 360° with the borehole; and
- determining a formation characteristic at a radial direction around the borehole, the formation characteristic determined based on the received measurement information, the radial direction determined from the relative bearing information.

15. The method of claim 14, wherein the down-hole measurement device comprises a plurality of neutron detectors aligned asymmetrically with the neutron source.

16. The method of claim 15, wherein the plurality of neutron detectors comprise:
- at least one thermal neutron detector;
- at least one gamma detector.

17. The method of claim 16, wherein the plurality of neutron detectors comprise:
- a short thermal neutron detector;
- a long thermal neutron detector;
- a short gamma detector; and
- a long gamma detector.

18. The method of claim 14, additionally comprising inserting the measurement device into the borehole.

* * * * *